United States Patent
Ishizuka (10) Patent No.: US 9,235,789 B2
(45) Date of Patent: Jan. 12, 2016

(54) IMAGE PROCESSING APPARATUS, IMAGE PROCESSING METHOD, AND NON-TRANSITORY COMPUTER READABLE MEDIUM

(71) Applicant: FUJI XEROX CO., LTD., Minato-ku, Tokyo (JP)

(72) Inventor: Ryuichi Ishizuka, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/469,655

(22) Filed: Aug. 27, 2014

(65) Prior Publication Data
US 2015/0248599 A1    Sep. 3, 2015

(30) Foreign Application Priority Data

Feb. 28, 2014 (JP) ................. 2014-038005

(51) Int. Cl.
*H04N 1/405* (2006.01)
*G06K 15/02* (2006.01)

(52) U.S. Cl.
CPC ........ *G06K 15/1835* (2013.01); *G06K 15/1878* (2013.01); *G06K 15/1886* (2013.01)

(58) Field of Classification Search
CPC ....... H04N 1/52; H04N 1/4058; H04N 1/405; H04N 1/4051; H04N 1/00846; H04N 1/4055; H04N 1/6033; H04N 1/233; G06F 3/1247; G06F 15/027; G06F 15/1881

USPC ............... 358/1.9, 2.1, 3.2–3.21, 3.16, 3.06, 358/3.26–3.27, 3.29, 3.31, 296; 382/162–167

See application file for complete search history.

(56) References Cited

U.S. PATENT DOCUMENTS

| 5,315,406 A * | 5/1994 | Levien ............ 358/3.2 |
| 5,731,884 A * | 3/1998 | Inoue ............ 358/3.06 |
| 8,437,037 B2 * | 5/2013 | Broddin et al. ........ 358/1.9 |
| 2012/0213439 A1 | 8/2012 | Kawano |
| 2013/0058569 A1 | 3/2013 | Kawano |

FOREIGN PATENT DOCUMENTS

| JP | 03-187571 A | 8/1991 |
| JP | 2012-175220 A | 9/2012 |
| JP | 2013-054601 A | 3/2013 |

* cited by examiner

*Primary Examiner* — Thomas D Lee
*Assistant Examiner* — Stephen M Brinich
(74) *Attorney, Agent, or Firm* — Sughrue Mion, PLLC (57) ABSTRACT

An image processing apparatus includes a detector, a memory, and a converter. The detector detects a ruling and an angle of a screen from a binary image of each plate, the binary image being obtained as a result of screen processing. The memory stores a detection result for a plate for which a ruling and an angle have been detected by the detector. The converter converts an image obtained as a result of screen processing into a multi-level image by using, for a plate for which a detection result has been stored in the memory, a ruling and an angle in the detection result, or by using, for a plate other than the plate for which a detection result has been stored in the memory, a ruling and an angle obtained as a result of detection performed by the detector.

15 Claims, 9 Drawing Sheets

| PLATE | RULING | ANGLE |
|---|---|---|
| C | 164.8 | 74.0 |
| M | 169.7 | 45.0 |
| Y | 171.4 | 0.0 |
| K | 176.4 | 17.1 |

FIG. 5B

| PLATE | RULING | ANGLE |
|---|---|---|
| C | 164.8 | 74.0 |
| M | 169.7 | 45.0 |
| Y | 185.6 | 0.0 |
| K | 176.4 | 32.8 |

DETECTION RESULT 1

| PLATE | RULING | ANGLE |
|---|---|---|
| C | 164.8 | 74.0 |
| M | 169.7 | 45.0 |
| Y | 171.4 | 0.0 |
| K | 176.4 | 17.1 |

FIG. 8B

DETECTION RESULT 2

| PLATE | RULING | ANGLE |
|---|---|---|
| C | 164.8 | 15.9 |
| M | 169.7 | 45.0 |
| Y | 171.4 | 0.0 |
| K | 176.4 | 72.8 |

FIG. 8C

DETECTION RESULT 3

| PLATE | RULING | ANGLE |
|---|---|---|
| C | 94.6 | 15.4 |
| M | 99.2 | 76.5 |
| Y | 95.4 | 28.3 |
| K | 97.1 | 45.0 |

IMAGE PROCESSING APPARATUS, IMAGE PROCESSING METHOD, AND NON-TRANSITORY COMPUTER READABLE MEDIUM

CROSS-REFERENCE TO RELATED APPLICATIONS

This application is based on and claims priority under 35 USC 119 from Japanese Patent Application No. 2014-038005 filed Feb. 28, 2014.

BACKGROUND (i) Technical Field

The present invention relates to an image processing apparatus, an image processing method, and a non-transitory computer readable medium.

(ii) Related Art

In general, in order to form a color image, separate plates that correspond to respective color components, such as cyan (C), magenta (M), yellow (Y), and, in some cases, black (K), are prepared, and screen processing is performed on images of the respective plates. An image of the original plate is multi-level, while an image of each plate on which screen processing has been performed is binary. For example, in the case of printing, a color image is printed by depositing ink using an ink corresponding to the plate if the binary value is either of the two values.

A technique has been available in which an image, each plate of which is binary as a result of screen processing, is converted into an image, each plate of which is multi-level.

In the case of processing a series of images, it is presumed that the screen rulings and angles of inputted images on which screen processing has been performed are not changed. In such a case, processing of detecting the screen ruling and angle of each image is wasteful, and it is sufficient to detect the screen ruling and angle from any one image and use the detection result for other images. However, an image used to detect the screen ruling and angle does not necessarily have plates corresponding to all color components that are used. For a plate corresponding to a color component not used in an image that is a detection target, the screen ruling and angle are not detected, and multi-level conversion is not performed if the color component is used in other images. If an image that is a detection target is a character image or an image in which a halftone is not used, that is, an image which includes only a solid area, the screen ruling and angle are not detected or erroneously detected, and erroneous multi-level conversion processing may be performed on a series of images.

SUMMARY

According to an aspect of the invention, there is provided an image processing apparatus including a detector, a memory, and a converter. The detector detects a ruling and an angle of a screen from a binary image of each plate, the binary image being obtained as a result of screen processing. The memory stores a detection result for a plate for which a ruling and an angle have been detected by the detector. The converter converts an image obtained as a result of screen processing into a multi-level image by using, for a plate for which a detection result has been stored in the memory, a ruling and an angle in the detection result, or by using, for a plate other than the plate for which a detection result has been stored in the memory, a ruling and an angle obtained as a result of detection performed by the detector.

BRIEF DESCRIPTION OF THE DRAWINGS

An exemplary embodiment of the present invention will be described in detail based on the following figures, wherein.

DETAILED DESCRIPTION

Figure 1:
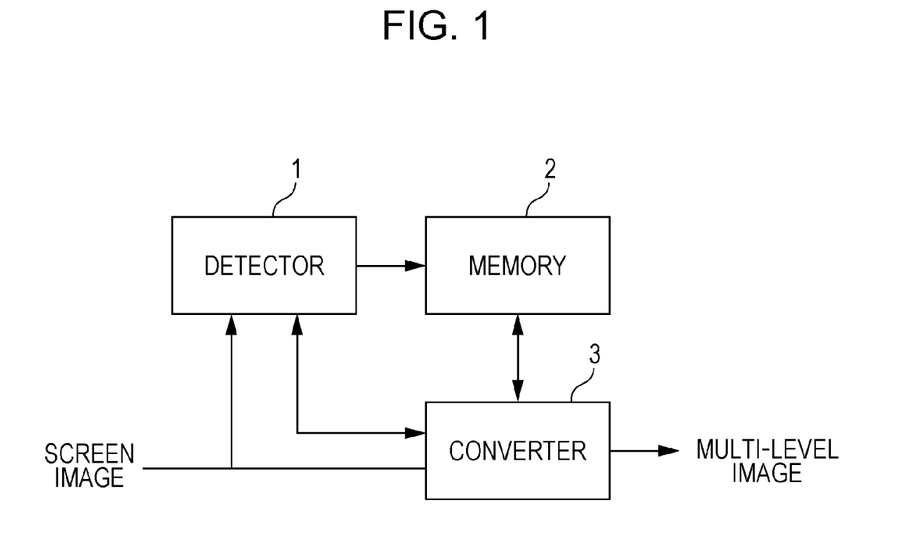
FIG. 1 is a block diagram illustrating a configuration of an exemplary embodiment of the present invention.

FIG. 1 is a block diagram illustrating a configuration of an exemplary embodiment of the present invention. In FIG. 1, the configuration includes a detector 1, a memory 2, and a converter 3. In the configuration illustrated in FIG. 1, an image on which screen processing has been performed is inputted, and a multi-level image obtained by performing multi-level conversion processing on that image is outputted. The inputted image on which screen processing has been performed is illustrated as a screen image. The screen image is separated in accordance with color components, and an image corresponding to each color component is called a plate. Each plate becomes binary as a result of screen processing. Accordingly, a screen image is formed of one or plural binary images of plates on which screen processing has been performed. Color components may be composed of three color components including C, M, and Y, four color components further including K in addition to C, M, and Y, or color components further including a spot color in addiction to C, M, Y, and K, for example. Alternatively, color components may be composed by combining color components of another type, such as red (R), green (G), and blue (B).

The detector 1 detects the screen ruling and angle from an image of each plate of the screen image. A well-known method may be used as a method of detection.

The memory 2 stores, for a plate for which the ruling and angle have been detected by the detector 1, the screen ruling and angle, which are a detection result, by associating the screen ruling and angle with the color component of the plate. Storing of a detection result may be performed in the case where the converter 3 determines that there is no inconsistency. For a plate for which the screen ruling and angle have not been detected by the detector 1, the memory 2 does not store any ruling or angle.

The converter 3 converts the screen image into a multi-level image. When performing conversion, the converter 3 uses, for a plate for which a detection result has been stored in the memory 2, the ruling and angle in the detection result, and performs conversion. For a plate for which a detection result has not been stored in the memory 2, the converter 3 makes the detector 1 detect the screen ruling and angle, and performs conversion by using the detected ruling and angle. The detected ruling and angle are stored in the memory 2 while being associated with the color component of the plate on which the detection has been performed. For a plate for which the screen ruling and angle could not be detected by the detector 1, multi-level conversion processing is performed using the average. Conversion may be performed by using a ruling and an angle set in advance. For a plate for which the ruling and angle could not be detected, no ruling or angle is stored in the memory 2.

In the case where the converter 3 uses a detection result obtained by the detector 1, the converter 3 determines whether there is an inconsistency between the ruling and angle detected by the detector 1 and the ruling and angle of another plate. If there is no inconsistency, the converter 3 may perform conversion by using the detection result and store the detection result in the memory 2. If there is an inconsistency, the converter 3 does not store the detection result in the memory 2 and makes the detector 1 detect the ruling and angle for the plate that is inconsistent or for all of the plates. Alternatively, the converter 3 may report the inconsistency to a user as an error. In the case where a measure, such as narrowing a target area, for example, is taken in order to accelerate the speed of detection performed by the detector 1, setting, such as making the target area wider than at the time of previous detection or changing the direction in which detection is started, may be performed on the detector 1 when the converter 3 makes the detector 1 detect the ruling and angle of the plate that is inconsistent. In the case where a detection method is used in which the distribution of rulings and angles detected by the detector 1 is obtained and the peak value of the distribution is outputted as a detection result, and it is assumed that a detection result cannot be outputted if there is no peak, setting, such as changing a threshold used in peak determination, may be performed. In the case where the detector 1 performs detection on the basis of line areas, setting, such as making a consecutive-same-result count larger than the current value, may be performed. The consecutive-same-result count indicates the number of lines for which the results of determination are consecutively the same and, if the results of determination are consecutively the same for the lines, the detection result is fixed. Setting, such as making a threshold used to determine that the results of determination are the same in the above-described case smaller than the current value, may be performed. In the case of determination of consecutiveness, setting as to whether or not consecutiveness is determined by disregarding a blank area or a character area may be changed so as to determine consecutiveness without taking into consideration a blank area or a character area.

In the case where the converter 3 uses a detection result stored in the memory 2, the converter 3 may determine whether or not the detection result may be used before using the detection result. For example, the converter 3 makes the detector 1 detect the ruling and angle of a plate that meets a predetermined condition and, in the case where the ruling and angle of the plate have been stored in the memory 2, the converter 3 may perform determination by comparing the ruling and angle with the detection result. As a result of determination, if use of the detection result stored in the memory 2 is not appropriate, detection of the rulings and angles of the remaining plates may be performed by the detector 1, and conversion based on the result of the detection and storage in the memory 2 may be performed.

Figure 2:
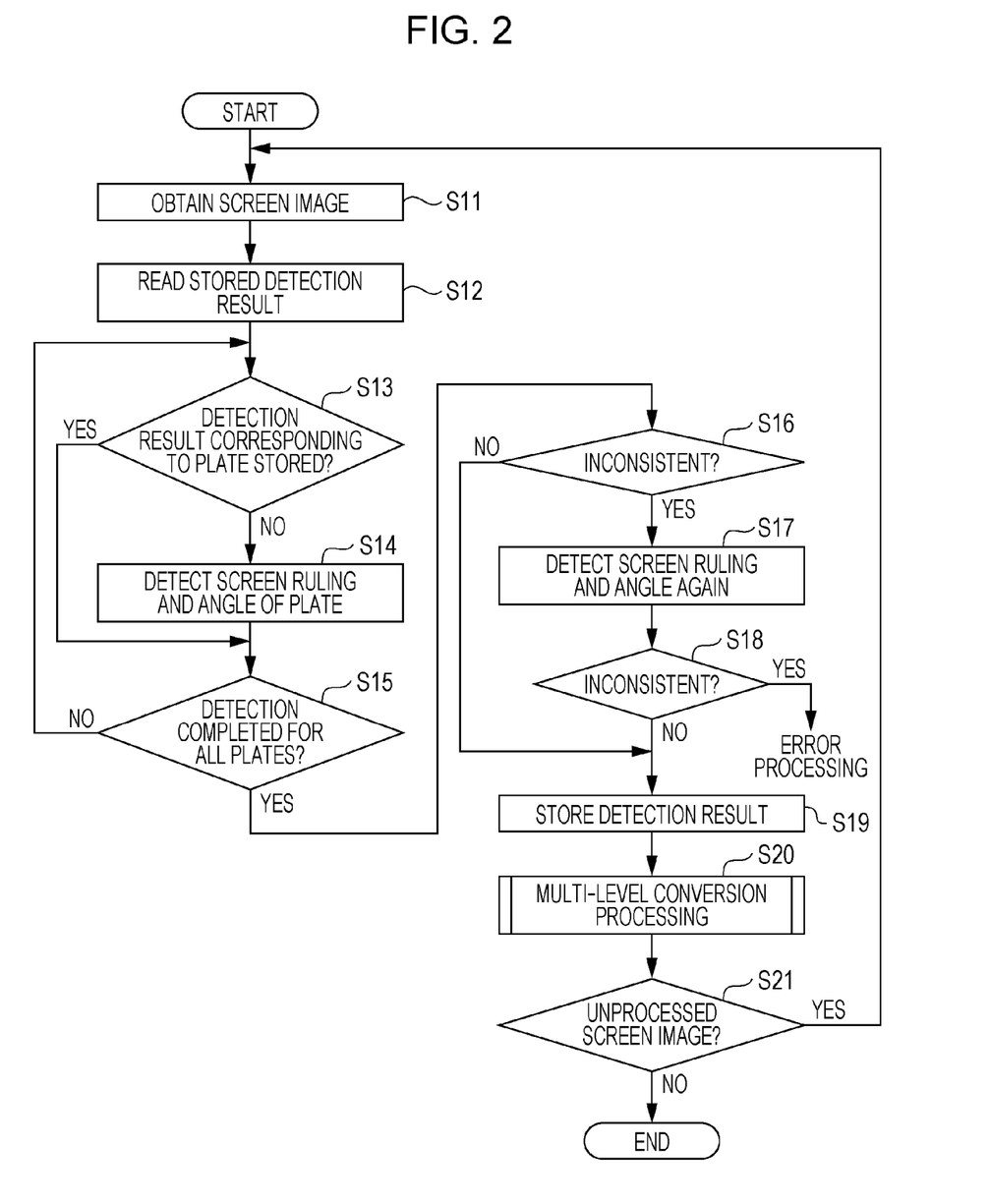
FIG. 2 is a flowchart illustrating an example of operations performed in an exemplary embodiment of the present invention.

FIG. 2 is a flowchart illustrating an example of operations performed in an exemplary embodiment of the present invention. First, in step S11, the converter 3 obtains a screen image that is a processing target. In step S12, the converter 3 reads from the memory 2 a detection result obtained by the detector 1.

In step S13, it is determined whether or not a detection result corresponding to one of the plates that form the screen image has been stored in the memory 2. If a corresponding detection result has not been stored, the detector 1 detects the screen ruling and angle of the plate in step S14. If a corresponding detection result has been stored, the flow proceeds to step S15 without performing detection.

In step S15, it is determined whether or not detection processing has been completed for all plates that form the screen image. If there is an unprocessed plate, the flow returns to step S13 and detection processing on the unprocessed plate is performed. If detection processing on all plates has been completed, the flow proceeds to step S16. For a plate for which a detection result has been stored in the memory 2, detection processing of detecting the screen ruling and angle performed by the detector 1 is omitted and therefore time used to perform the detection processing is saved.

In step S16, it is determined whether there is an inconsistency between the detection results corresponding to the respective plates. An example of determination of an inconsistency will be described below. For a plate that includes only small print or a plate on which a solid and fine pattern is drawn, for example, the screen ruling and angle detected by the detector 1 may contain an error. Therefore, processing in step S16 is performed so as not to perform multi-level conversion processing on the basis of an erroneous detection result. If there is no inconsistency, the flow proceeds to step S19.

If it is determined in step S16 that there is an inconsistency, the converter 3 makes the detector 1 detect again the ruling and angle for a plate that is inconsistent or for all of the plates in step S17. Alternatively, the inconsistency may be reported to a user as an error and thereafter the processing may end or the processing may be continuously performed by using the detection result without performing detection again, in response to an instruction for continuing the processing given by the user.

In the case where detection of the screen ruling and angle has been performed again by the detector 1, it is determined, for a plate for which detection of the screen ruling and angle has been newly performed, whether there is an inconsistency in step S18. Even though detection of the screen ruling and angle has been performed again in step 17, if it is determined in step S18 that there is an inconsistency, processing to be performed in case of an error is performed. For example, the error is reported to a user and the processing ends. Alternatively, the processing may be continuously performed by using the detection result without performing detection again, in response to an instruction for continuing the processing given by the user, or the processing may be continuously performed on other plates without using the detection result corresponding to the plate that is inconsistent. Alternatively, the processing may be continuously performed by performing multi-level conversion using the average, or the processing may be continuously performed by using a ruling and an angle set in advance. In the case where the processing is continuously performed, the flow proceeds to step S20 without storing the detection result in step S19.

Instead of performing determination in step S18, the flow may return to step S16 in order to perform the determination. In the case of returning to step S16, the upper limit of the number of repetitions of detection processing may be set so as not to repeat the detection processing a number of times. The setting of the detector 1 may be changed each time the detection processing is repeated. The setting change may be performed on the detector 1 as follows. That is, setting, such as making a target area wider than at the time of the previous detection or changing the direction in which detection is started, may be performed. In the case where a detection method is used in which the distribution of rulings and angles detected by the detector 1 is obtained and the peak value of the distribution is outputted as a detection result, and it is assumed that a detection result cannot be outputted if there is no peak, setting, such as changing a threshold used in peak determination, may be performed. In the case where the detector 1 performs detection on the basis of line areas, setting, such as making a consecutive-same-result count larger than the current value, may be performed. The consecutive-same-result count indicates the number of lines for which the results of determination are consecutively the same and, if the results of determination are consecutively the same for the lines, the detection result is fixed. Setting, such as making a threshold used to determine that the results of determination are the same in the above-described case smaller than the current value, may be performed. In the case of determination of consecutiveness, setting as to whether or not consecutiveness is determined by disregarding a blank area or a character area may be changed so as to determine consecutiveness without taking into consideration a blank area or a character area. Determination of an inconsistency need not be performed and, if determination of an inconsistency is not performed, the processing in steps S16, S17, and S18 need not be performed.

In the case where it is determined in step S16 or S18 that there is no inconsistency, the ruling and angle of the plate detected in step S14 and the ruling and angle of the plate detected in step S17 are stored in the memory 2 in step S19. In the case where it is determined that there is an inconsistency as a result of determination performed in step S16, a detection result is stored if the inconsistency is resolved as a result of redetection performed in step S17. Accordingly, a detection result that has an inconsistency is not stored in the memory 2. In the case where detection of the screen ruling and angle to be performed in step S14 or S17 is not performed and a detection result stored in the memory 2 is used, storage in the memory 2 to be performed in step S19 need not be performed.

In step S20, the converter 3 performs multi-level conversion processing using the ruling and angle of each plate. A plate for which the ruling and angle have not been stored in the memory 2 is assumed to be a plate including solid print or a plate on which a solid figure is drawn and therefore multi-level conversion processing using the average is performed or multi-level conversion processing is performed using a ruling and an angle set in advance. It is determined whether there is an unprocessed image in step S21. If there is an unprocessed image, the flow returns to step S11 while assuming the unprocessed image to be a processing target, and processing is performed on the image. If there is no more unprocessed image, the processing ends.

Figure 3:
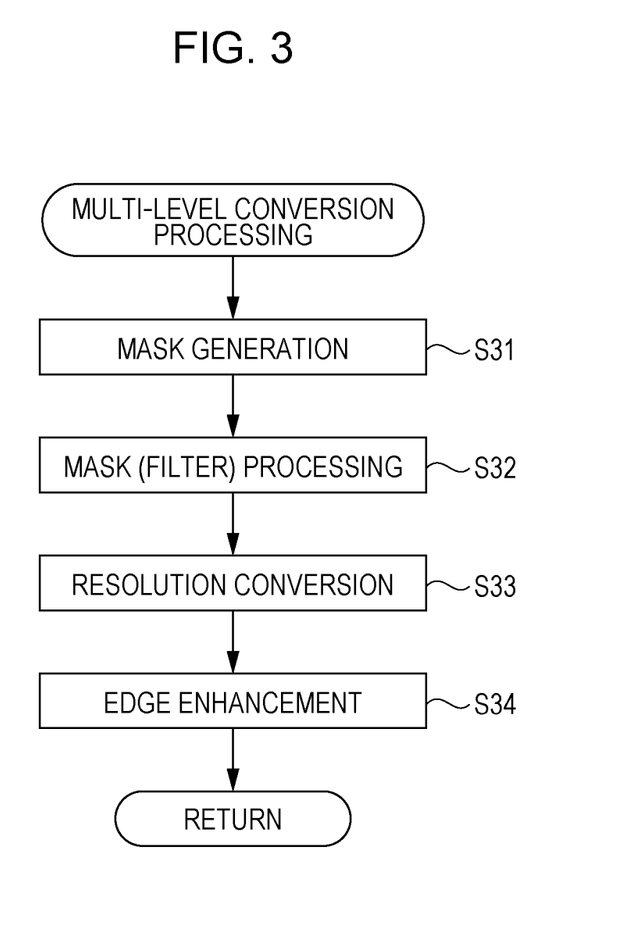
FIG. 3 is a flowchart illustrating an example of multi-level conversion processing.

FIG. 3 is a flowchart illustrating an example of multi-level conversion processing performed in step S20 in FIG. 2. In step S31, a mask that indicates a pixel area used in multi-level conversion processing is generated from a screen ruling and a screen angle detected by the detector 1 or stored in the memory 2. In step S32, the mask generated in step S31 is used to obtain a multi-level pixel value in the pixel area corresponding to the mask by performing filter processing.

In step S33, resolution conversion is performed in accordance with the resolution of a multi-level image to be obtained, however, this processing need not be performed, as a matter of course, if resolution conversion is not necessary. In step S34, edge enhancement processing is performed. This processing may be performed as processing for correcting blurring that has resulted from filter processing performed in order to obtain a multi-level image in step S32. The blurring is generated because the amount of information of the inputted screen image is not on a pixel-by-pixel basis. As a matter of course, this edge enhancement processing need not be performed when not necessary.

As described above, in the case where a screen ruling and a screen angle are given, a plate on which screen processing has been performed is converted into a multi-level image. This processing may be performed on each plate to thereby obtain a multi-level color image. As a matter of course, various types of known processing may be used as the multi-level conversion processing.

Figure 4A:
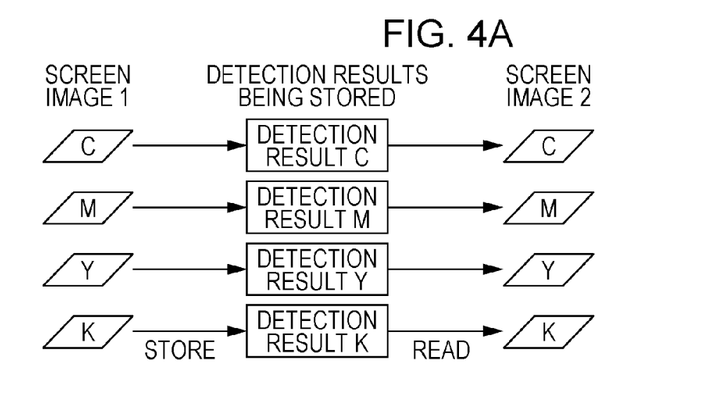
FIGS. 4A to 4C are diagrams illustrating examples of operations performed in an exemplary embodiment of the present invention.
Figure 4B:
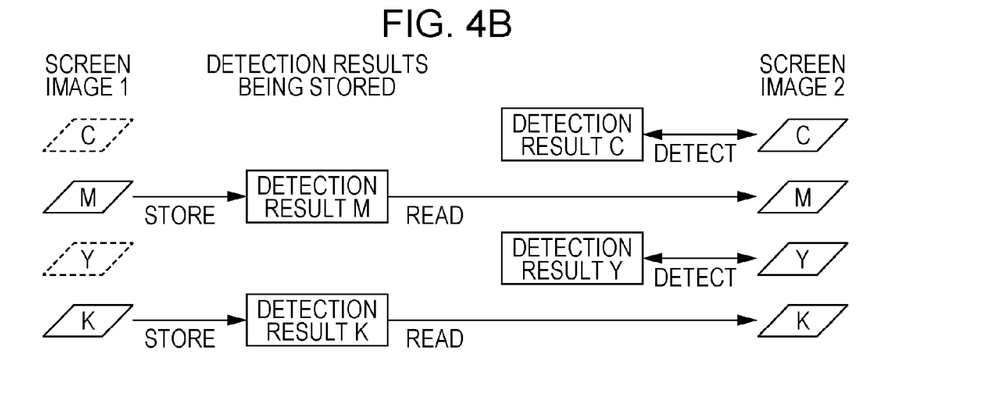
Figure 4C:
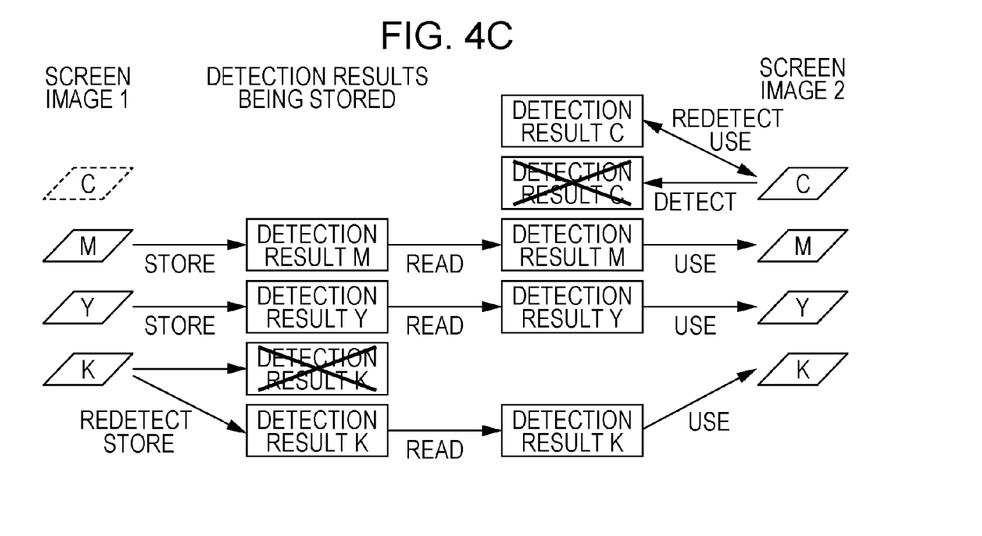

FIGS. 4A to 4C are diagrams illustrating examples of operations performed in an exemplary embodiment of the present invention. Here, it is assumed that a screen image is formed of four plates, that is, C, M, Y, and K plates, for example. As a matter of course, the configuration of plates is not limited to this case.

In the example of operations described above, for the first screen image, a detection result has not been stored in the memory 2 and therefore detection of the screen ruling and angle is performed for each plate in step S14 and the detection result is stored in the memory 2 in step S19. For the next screen image, if a detection result has been stored in the memory 2, multi-level conversion is performed by using the detection result. FIG. 4A illustrates a case where the screen ruling and angle are detected for all four plates that form a screen image 1 and are stored in the memory 2, and detection results corresponding to the four plates which have been stored in the memory 2 are used for a screen image 2.

In a series of screen images on which multi-level conversion processing is successively performed, it is presumed that the screen ruling and angle are the same for each color plate. For example, it is presumed that the screen ruling and angle of a C plate of a screen image are also used in a C plate of the succeeding screen image. In such a case, a detection result detected from the preceding screen image is stored and the detection result is used for the succeeding screen image to thereby omit duplicated processing of detecting the screen ruling and angle.

For example, in the case where there is a certain plate that is not used in the first screen image, a detection result corresponding to the plate is not stored in the memory 2. In the case where the plate that is not used in the first screen image is used in the next screen image, the screen ruling and angle are detected in step S14 for the plate for which a detection result has not been stored in the memory 2. Accordingly, even if the first screen image does not have every plate, processing is performed on the succeeding screen image without any problem.

An example illustrated in FIG. 4B is a case where screens are detected only for two plates, that is, an M plate and a K plate in the screen image 1. In this case, the screen rulings and angles of the two plates, that is, the M plate and K plate, are detected from the screen image 1 and are stored in the memory 2. Regarding the succeeding screen image 2, detection results stored in the memory 2 are those corresponding to the M and K plates. For the two plates of C and Y plates, corresponding detection results cannot be obtained from the memory 2 and therefore detection of the screen ruling and angle is newly performed by the detector 1. If the newly detected screen rulings and angles of the C and Y plates are consistent with the detection results corresponding to the M and K plates, the newly detected screen rulings and angles are stored in the memory 2 and are used in multi-level conversion performed on the succeeding screen images.

In the case where a screen image has a plate that includes small print or a plate on which a solid and fine pattern is drawn, detection of the screen ruling and angle may be erroneously performed. Even in such a case, if determination of an inconsistency is performed in step S16, erroneous multi-level conversion processing is not performed, which is caused by the use of the erroneous detection result.

For example, in FIG. 4C, it is assumed that M, Y, and K plates are used in the screen image 1 and the screen ruling and angle detected from the K plate among the three plates are inconsistent with the screen rulings and angles of the remaining plates. The inconsistent detection result is crossed out in FIG. 4C. In this case, for the K plate or for the three plates, detection of the screen ruling and angle is performed again in step S17. In this example, it is assumed that the inconsistency is resolved as a result of the detection of the screen ruling and angle that has been performed again. The detection result that is not inconsistent is stored in step S19, and multi-level conversion processing is performed in step S20 by using the detection result.

Regarding the screen image 2, for the M, Y, and K plates, corresponding detection results obtained from the screen image 1 are read from the memory 2 and are used and, for the C plate, a corresponding detection result is not stored in the memory 2 and therefore the screen ruling and angle are newly detected. Here, it is assumed that the detection result newly obtained from the C plate is inconsistent with the screen rulings and angles of other plates, and the inconsistent detection result is crossed out in FIG. 4C. In this case, for the C plate, for the three plates other than the C plate, or for all four plates, detection of the screen ruling and angle is performed again in step S17. Determination as to whether there is an inconsistency is performed in step S18 and, if there is no inconsistency, the detection result is stored and multi-level conversion is performed. If there is an inconsistency even after detection has been performed again, the inconsistency is assumed to be an error and the processing is stopped, or multi-level conversion is performed on the basis of the detection result that is inconsistent. In this case, the detection result is not stored.

As described above, a screen ruling and a screen angle detected by the detector 1 are used for the succeeding screen image to thereby omit processing of detecting the screen ruling and angle and reduce the processing time. Furthermore, a detection result that has an inconsistency is not stored so as not to affect multi-level conversion to be performed on the succeeding screen image.

Next, an example of determination of an inconsistency that is performed in step S16 or S18 will be described. First, regarding the ruling, determination as to whether there is a plate that has a different ruling may be performed. One image is separated into plates and therefore the rulings of the plates are not different from one another. Accordingly, it may be determined that a plate having a ruling different from those of the remaining plates is inconsistent.

In the case of performing this determination, determination as to whether or not the ruling is within a predetermined range of an allowance may be performed by taking into consideration a detection error in the detector 1. The upper limit and lower limit of the allowance may be individually set. For example, in the case where a screen image has a resolution of 2400 dpi (pixels/25.4 mm) and a screen of 175 lpi is used, one pixel area in the screen has 15.7 pixels, which is obtained by dividing 2400 by 175. However, image processing has no choice but to be performed on a pixel-by-pixel basis and therefore there may be an error in the calculation of the ruling and angle of the screen. The upper limit and lower limit are set in advance as an allowance by taking into consideration this error. A specific example of an allowance is as follows. That is, for a screen image having a ruling of 175 lpi, the upper limit is set so as to be +5 lpi and the lower limit is set so as to be −15 lpi, and determination of an inconsistency may be performed on the basis of whether or not the detected ruling is within a range between 160 lpi and 180 lpi. If there is a plate the ruling of which is outside the range, it may be determined that the plate is inconsistent with other plates in terms of the ruling.

Regarding the angle, determination as to whether or not the angles of the plates are different from one another may be performed basically. Generally, the screen angles of plates that form an image are made different from one another. For example, in the case of three plates, screens respectively having the screen angles of 0°, 30°, and 60°, for example, may be used. In the case of four plates, screens respectively having the screen angles of 0°, 15°, 45°, and 75°, for example, may be used. In either of the above cases, screens having different screen angles are used. Therefore, a condition that the screen angles of respective plates are different is a basic requirement.

Also in the case of the angle, a detection error in the detector 1 may be taken into consideration. For example, an angle allowance may be set in advance, and determination may be performed as to whether or not the screen angle of a plate falls within the range of the angle allowance on the basis of the screen angle detected from a certain plate. For example, in the case where the angle allowance is assumed to be 5°, if there are a plate the detected screen angle of which is 17.1° and a plate the detected screen angle of which is 15.9°, it may be determined that there is an inconsistency.

Furthermore, relationships among the screen angles of respective plates may be determined. For example, for each plate, the angle differences between the plate and other plates are checked sequentially, and the number of plates that have a difference of 30° and the number of plates that have a difference of 60° (including those within the angle allowance) are counted. Then, it may be checked that the counted numbers are such that the number of plates having an angle difference of 30° is one or more and the number of plates having an angle difference of 60° is one or more.

In the case where the number of plates is five or more, there may be plural plates the angle differences among which are other than the angle of 30° or 60°, that is, 15° or 0°, for example. For plates that are not overlaid or plates that have no effect even if the plates are overlaid, a certain screen angle may be shared. In such a case, it may be determined that there is no inconsistency if four plates satisfy a condition. Alternatively, an error may be reported to a user and, if the user gives an instruction to perform the processing, the processing may be continuously performed although the detected inconsistency is left unresolved.

In the determination condition described above, the color of each plate is not specified. In the case where four plates of C, M, Y, and K plates that are used in general are specified, for example, more specific conditions may be set. For example, it is assumed that the angle difference between the C plate and the M plate is 30° or 60°. In the case where the angle difference between the C plate and the M plate is 60°, it may be checked that the angle difference between the K plate and the C or M plate is 30°. In this case, for either of the C plate and M plate, the angle difference from the K plate may be determined. In the case where the angle difference between the C plate and the M plate is 30°, it may be checked that, regarding the K plate, the angle differences from the C plate and the M plate are such that the angle difference from one of the C and M plates is 30° and the angle difference from the other of the C and M plates is 60°.

Even in this case, determination of the angle difference may be performed using an angle allowance. For example, in the case of determining the angle difference between the C plate and the M plate, it is assumed that the angle allowance is 7°. Then, in the case where the screen angle of the C plate detected by the detector 1 is 74.0° and the screen angle of the M plate detected by the detector 1 is 17.1°, the angle difference is 57.9°, which falls within the range of 60°±7°. Therefore, in the case of this example, the condition regarding the angle difference between the C plate and the M plate is satisfied. Furthermore, if it is confirmed that the angle difference between the K plate and the C or M plate is 30°, it is determined that there is no inconsistency in terms of the screen angle.

As a matter of course, the above-described conditions used in determination of an inconsistency are merely examples, and determination of an inconsistency may be performed on the basis of a condition other than those described above. A condition used in determination of an inconsistency may be set in accordance with the condition of a screen that is possibly used.

Figure 5A:
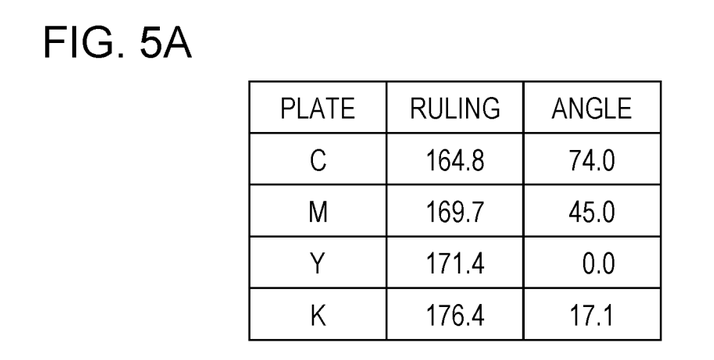
FIGS. 5A and 5B are diagrams illustrating specific examples of screen rulings and angles detected by a detector.
Figure 5B:
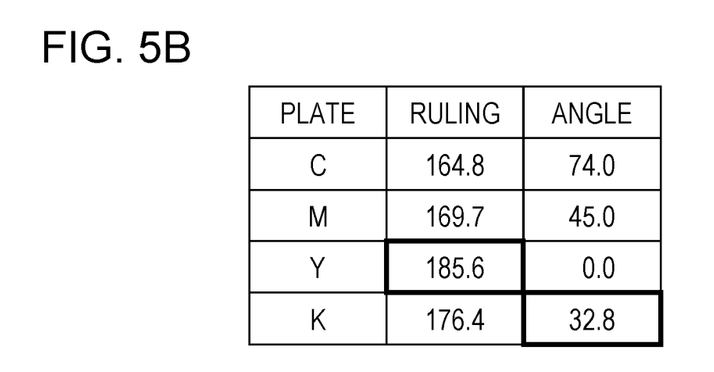

FIGS. 5A and 5B are diagrams illustrating specific examples of screen rulings and angles detected by the detector 1. Here, it is assumed that a screen image is formed of four plates, that is, C, M, Y, and K plates, for example. Furthermore, it is assumed that, as the rulings and angles of respective plates detected by the detector 1, the values illustrated in FIGS. 5A and 5B have been obtained. Here, it is assumed that the upper limit and lower limit of the allowable range of the ruling are +5 lpi and −15 lpi respectively, that is, it is assumed that the range of the difference in the ruling, which is 20 lpi, is assumed to be an allowable range. Furthermore, it is assumed that the angle allowance is 5°.

In the example illustrated in FIG. 5A, the rulings are within the range of 20 lpi, which is the allowable range. Regarding the angle, the angle difference between the C plate and the M plate is 29°, which falls within the range of 30°±5°. The angle difference between the K plate and the C plate is 56.9°, which falls within the range of 60°±5°. The angle difference between the K plate and the M plate is 27.9°, which falls within the range of 30°±5°. Therefore, it is determined that there is no inconsistency in terms of the ruling and angle.

In the example illustrated in FIG. 5B, the ruling of the Y plate is outside the range of 20 lpi, which is the allowable range, compared with the remaining plates. Therefore, it is determined that the Y plate is inconsistent in terms of the ruling. Regarding the angle, the angle difference between the C plate and the M plate is 29°, which falls within the range of 30°±5°. However, the angle difference between the K plate and the C plate is 41.2°, which is outside the range of 60°±5°. Furthermore, the angle difference between the K plate and the M plate is 12.2°, which is outside the range of 30°±5°. Therefore, it is determined that the K plate is inconsistent in terms of the screen angle. For a plate that has been determined to be inconsistent as described above or for all of the plates, detection of the screen ruling and angle by the detector 1 may be performed again, and determination of an inconsistency may be performed on the detection result.

Figure 6:
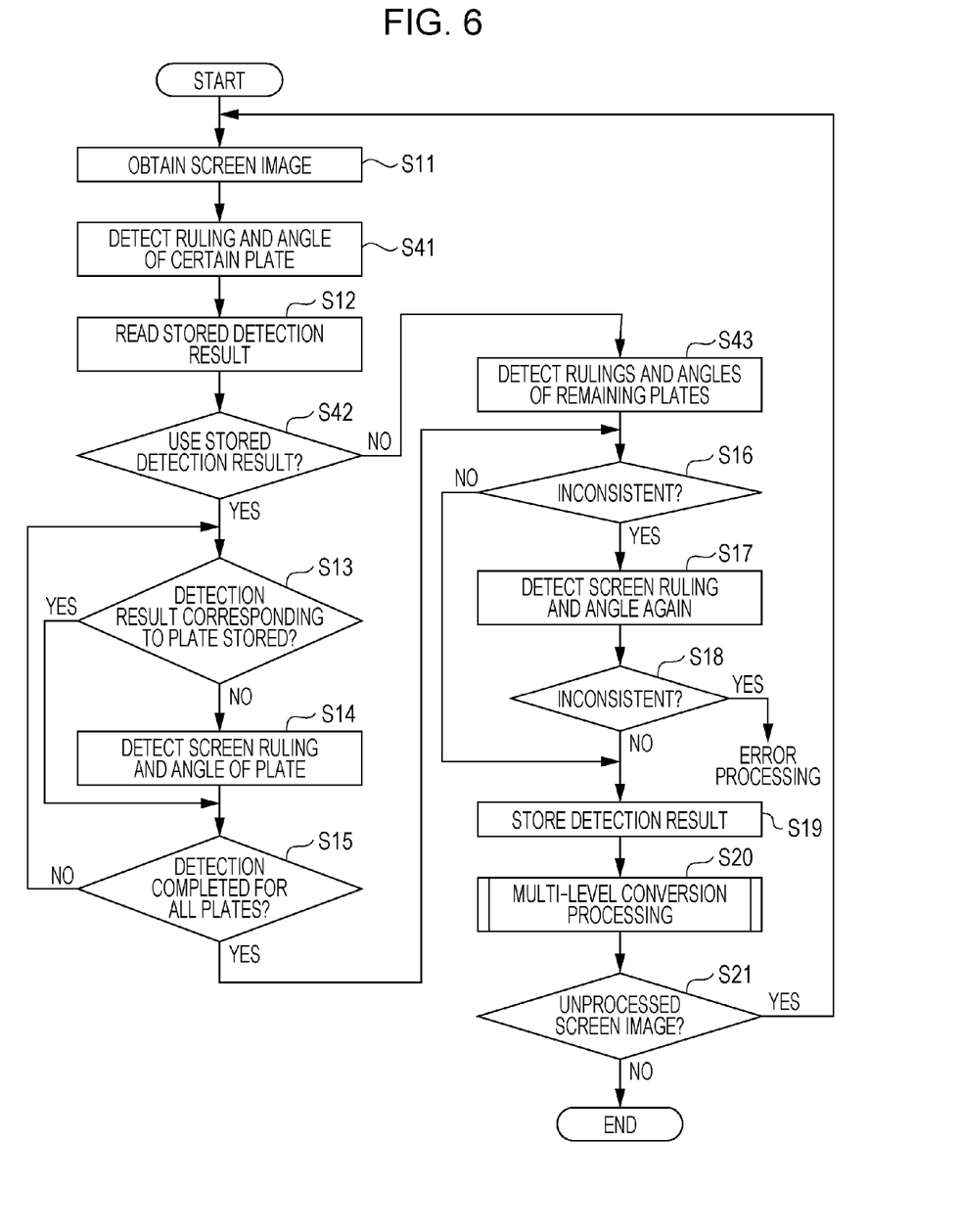
FIG. 6 is a flowchart illustrating another example of operations performed in an exemplary embodiment of the present invention.

FIG. 6 is a flowchart illustrating another example of operations performed in an exemplary embodiment of the present invention. In the example of operations illustrated in FIG. 2, a detection result stored in the memory 2 is used while assuming that the screen ruling and angle are the same for each color plate in a series of screen images that are processing targets. In the example of operations illustrated in FIG. 6, for each screen image that is a processing target, it is determined whether or not a detection result stored in the memory 2 may be used before using the detection result so as to deal with a case where a screen image that has a different screen ruling and a different screen angle is a processing target, for example. Note that, for processing that has been described with reference to FIG. 2, duplicated description will be omitted.

After a screen image that is a processing target has been obtained in step S11, the detector 1 detects the screen ruling and angle of a plate that meets a predetermined condition in step S41. A plate that meets a predetermined condition may be a plate that is obtained first when a screen image is obtained or a plate that corresponds to a predetermined color, for example. In this example of operations, the processing in step S41 is performed regardless of whether or not a detection result is stored in the memory 2.

After a detection result has been read from the memory 2 in step S12, for the plate that meets a predetermined condition, the detection result obtained in step S41 and a detection result stored in the memory 2 which corresponds to the plate are compared, and it is determined whether or not the stored detection result is to be used in step S42. As a result of the comparison, if the detection result stored in the memory 2 falls within the range of an allowance on the basis of the detection result obtained in step S41, it is decided that the detection result stored in the memory 2 is to be used, the flow proceeds to step S13, and the subsequent processing that has been described above is performed.

As a result of the comparison, if the detection result stored in the memory 2 does not fall within the range of an allowance on the basis of the detection result obtained in step S41, it is determined that the use of the detection result stored in the memory 2 is not appropriate, and the detector 1 detects the screen rulings and angles of the remaining plates in step S43. After the detection has been completed, the flow proceeds to step S16 and determination of an inconsistency and the subsequent processing may be performed. In this case, the detection result stored in the memory 2 may be deleted, and a new detection result may be stored in step S19.

In the case where a detection result corresponding to the plate that meets a predetermined condition has not been stored in the memory 2, it may be assumed that the plate lacks a detection result and the flow may proceed to step S13, or such a case may be assumed to be an inconsistency in a detection result and detection of the screen ruling and angle may be performed for the remaining plates in step S43.

With the processing described above, even in the case where a screen image that has a screen ruling and a screen angle different from a screen ruling and a screen angle stored in the memory 2 is inputted, multi-level conversion processing in accordance with the ruling and angle of the inputted screen image is performed. As a matter of course, in the case of a screen image that is presumed to have a screen ruling and a screen angle stored in the memory 2, the detection result stored in the memory 2 is used for a plate other than the one plate for which detection has been performed in step S41. Accordingly, processing to be performed and time to be used for newly detecting a ruling and an angle are reduced.

Figure 7:
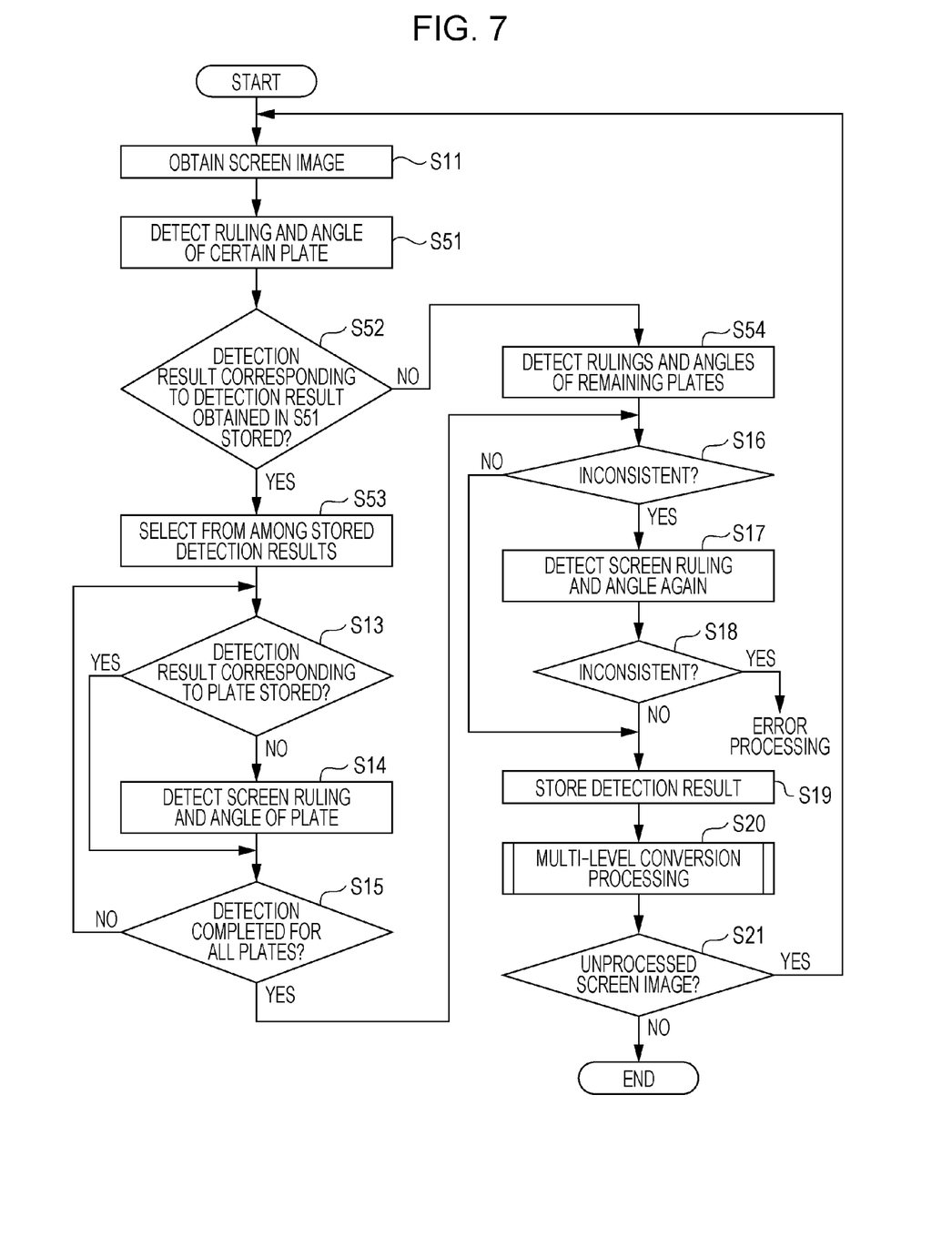
FIG. 7 is a flowchart illustrating yet another example of operations performed in an exemplary embodiment of the present invention.

FIG. 7 is a flowchart illustrating yet another example of operations performed in an exemplary embodiment of the present invention. The memory 2 may be configured so as to store plural detection results each of which is composed of combinations of the rulings and angles of respective plates. In this example of operations, an example of operations performed in the case where plural sets of detection results are stored in the memory 2 and are selectively used is illustrated.

After a screen image that is a processing target has been obtained in step S11, the detector 1 detects the screen ruling and angle of a plate that meets a predetermined condition in step S51. A plate that meets a predetermined condition may be a plate that is obtained first when a screen image is obtained or a plate that corresponds to a predetermined color, for example. Also in this example of operations, the processing in step 51 is performed regardless of whether or not a detection result is stored in the memory 2.

In step S52, it is determined, for the plate that meets a predetermined condition, whether or not a detection result corresponding to the detection result obtained in step S51 has been stored in the memory 2. Determination performed in this case is performed by taking into consideration the allowance for the ruling and the angle allowance for the angle described above. If a detection result corresponding to the detection result obtained in step S51 has been stored in the memory 2, the detection result stored in the memory 2 is to be used and therefore is selected in step S53. Thereafter, the flow proceeds to step S13 and the subsequent processing that has been described above is performed.

If it is determined in step S52 that a detection result corresponding to the detection result obtained in step S51 has not been stored in the memory 2 for the plate that meets a predetermined condition, the detector 1 detects the screen rulings and angles of the remaining plates in step S54. After the detection has been completed, the flow proceeds to step S16 and determination of an inconsistency and the subsequent processing may be performed.

Note that the processing in step S19 of storing a detection result in the memory 2 is performed as follows. That is, in the case where a detection result corresponding to the screen ruling and angle detected in step S51 has been stored in the memory 2 for the plate that meets a predetermined condition, the stored detection result does not include the rulings and angles of all of the plates, and detection of the screen ruling and angle has been performed in step S14, then the ruling and angle that have been detected for a plate on which detection has been newly performed are added to the stored detection result. If it is determined in step S52 that a detection result corresponding to the screen ruling and angle detected in step S51 for the plate that meets a predetermined condition has not been stored in the memory 2, combinations of the rulings and angles of respective plates that have been obtained in steps S51 and S54 are stored in the memory 2 as a new detection result.

In this example of operations, different combinations of rulings and angles are stored in the memory 2 and are selectively used. Therefore, even in the case where a screen image that has a different screen ruling or a different screen angle is inputted, multi-level conversion processing using a detection result stored in the memory 2 is performed. Accordingly, detection processing of detecting a screen ruling and a screen angle performed by the detector 1 and time used for the processing are reduced.

Figure 8A:
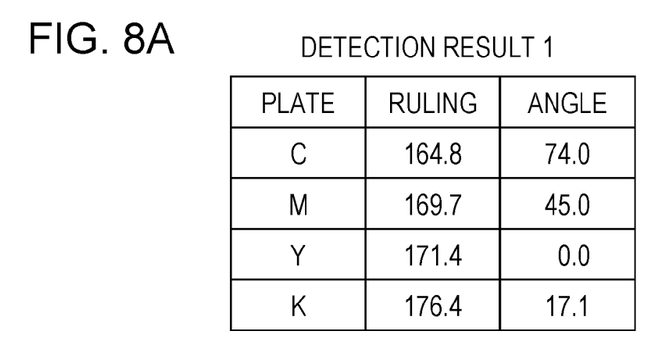
FIGS. 8A to 8C are diagrams illustrating specific examples of plural detection results stored in a memory.
Figure 8B:
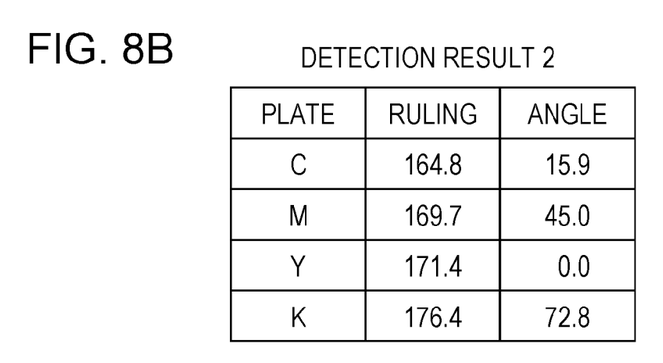
Figure 8C:
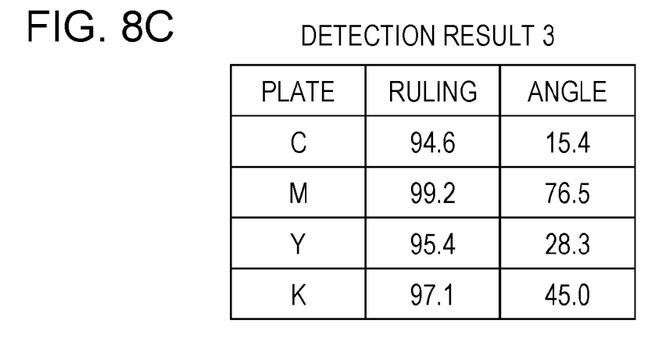

FIGS. 8A to 8C are diagrams illustrating specific examples of plural detection results stored in the memory 2. For example, it is assumed that three detection results illustrated in FIGS. 8A to 8C are stored. A detection result 1 illustrates an example of a detection result in the case where the angle of a C plate is 75°, the angle of an M plate is 45°, the angle of a Y plate is 0°, and the angle of a K plate is 15° while the ruling is 175 lpi. A detection result 2 illustrates an example of a detection result in the case where the angle of a C plate is 15°, the angle of an M plate is 45°, the angle of a Y plate is 0°, and the angle of a K plate is 75° while the ruling is 175 lpi. A detection result 3 illustrates an example of a detection result in the case where the angle of a C plate is 15°, the angle of an M plate is 75°, the angle of a Y plate is 30°, and the angle of a K plate is 45° while the ruling is 100 lpi. The values in the illustrated detection results are values that have been detected and fall within the allowance for the ruling or the angle allowance for the angle.

It is assumed that a screen image that is a processing target is inputted while the above-described detection results have been stored, the detector 1 detects the screen ruling and angle of a C plate, which is a plate that meets a predetermined condition, and the detected ruling is 164.9 lpi and the detected angle is 74.1°. Then, regarding the ruling, the ruling of the C plate in the detection result 1 and that in the detection result 2 correspond to the detected ruling. Regarding the angle, the angle of the C plate in the detection result 1 corresponds to the detected angle. Therefore, in this case, it is determined that a detection result corresponding to the detection result obtained from the C plate of the inputted screen image has been stored in the memory 2, and the corresponding detection result 1 is used. Accordingly, for the M plate, Y plate, and K plate, the detector 1 does not detect the screen ruling and angle, and the rulings and angles of the M plate, Y plate, and K plate in the detection result 1 stored in the memory 2 are used to perform multi-level conversion processing.

It is assumed that the detector 1 detects the screen ruling and angle of the C plate of a screen image that is a processing target, and the detected ruling is 98.7 lpi and the detected angle is 72.9°. Then, regarding the ruling, the ruling of the C plate in the detection result 3 corresponds to the detected ruling. However, regarding the angle, the detected angle is different from the angle of the C plate in the detection result 3. Therefore, in this case, it is determined that a detection result corresponding to the detection result obtained from the C plate of the inputted screen image has not been stored in the memory 2, the detector 1 detects the screen ruling and angle also for the remaining M plate, Y plate, and K plate, and multi-level conversion processing is performed using the detected result together with the result of detection previously performed on the C plate. In this case, the detection result obtained from the plates is newly stored in the memory 2 and is used when the subsequent screen image is processed.

Figure 9:
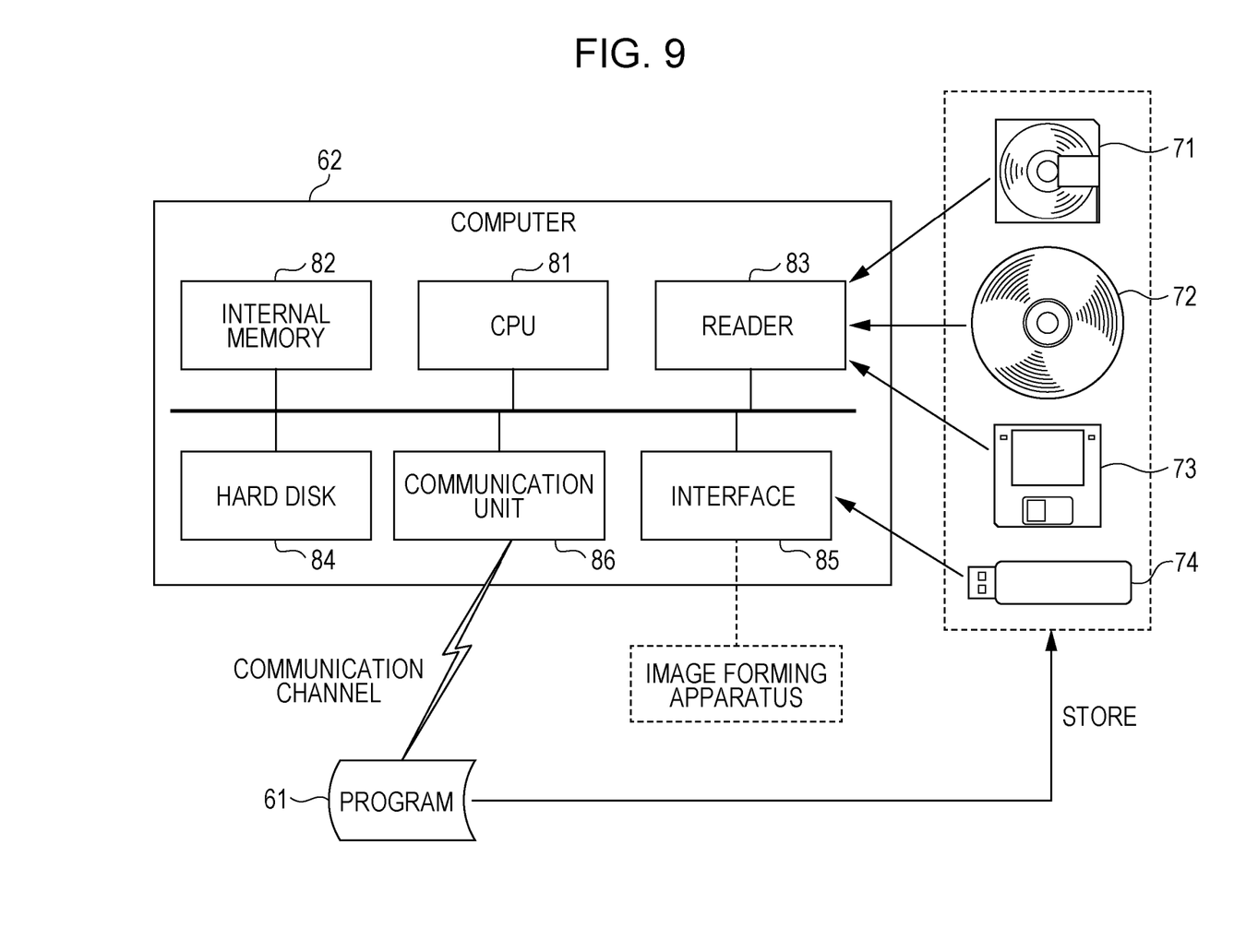
FIG. 9 is a diagram illustrating an example of a computer program, a recording medium storing the computer program, and a computer in a case of implementing a function described in an exemplary embodiment of the present invention using a computer program.

FIG. 9 is a diagram illustrating an example of a computer program, a recording medium storing the computer program, and a computer in the case of implementing a function described in an exemplary embodiment of the present invention using a computer program. In FIG. 9, a program 61, a computer 62, a magneto-optical disk 71, an optical disk 72, a magnetic disk 73, a memory 74, a central processing unit (CPU) 81, an internal memory 82, a reader 83, a hard disk 84, an interface 85, and a communication unit 86 are illustrated.

Part or all of the function described above as an exemplary embodiment of the present invention may be implemented using the program 61 that is executed by the computer 62. In this case, the program 61 and data used by the program 61 may be stored in a recording medium read by the computer 62. A recording medium is a device that changes the state of energy, such as magnetism, light, or electricity, applied to the reader 83 provided in a hardware resource of the computer 62, in accordance with the description of the program 61, and transmits the description of the program 61 to the reader 83 in the form of a signal that corresponds to the state. Examples of such a recording medium include the magneto-optical disk 71, the optical disk 72 (including a compact disk (CD), a digital versatile disk (DVD), and the like), the magnetic disk 73, and the memory 74 (including an integrated circuit (IC) card, a memory card, a flash memory, and the like). As a matter of course, these recording media are not limited to portable recording media.

The program 61 is stored in advance in these recording media, these recording media are connected to the reader 83 or the interface 85 of the computer 62, for example, the program 61 is read by the computer 62 and is stored in the internal memory 82 or the hard disk 84 (including a magnetic disk or a silicon disk), and the program 61 is executed by the CPU 81. In this way, all or part of the function described above as an exemplary embodiment of the present invention is implemented. Alternatively, all or part of the function described above as an exemplary embodiment of the present invention may be implemented by transferring the program 61 to the computer 62 via a communication channel, receiving the program 61 by the communication unit 86 of the computer 62 and storing the program 61 in the internal memory 82 or the hard disk 84, and executing the program 61 by the CPU 81.

Various apparatuses in addition to those described above may be connected to the computer 62 via the interface 85. For example, an image forming apparatus that forms an image on which multi-level conversion has been performed may be connected to the computer 62, or a display that displays various types of information to a user or an accepting apparatus that accepts an instruction given by a user may be connected to the computer 62. As a matter of course, various apparatuses in addition to those above-described may be connected to the computer 62 via the interface 85. Note that the constituent elements need not operate in one computer. For example, the memory 2 may be implemented by using another computer that is connected via a communication channel.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image processing apparatus comprising:
   a detector that configured to detect a ruling and an angle of a screen from a binary image of a plate, the binary image being obtained as a result of screen processing;
   a memory configured to store a detection result for the plate for which the ruling and the angle have been detected by the detector; and
   a converter configured to convert an image obtained as a result of screen processing into a multi-level image by using, for the plate for which the detection result has been stored in the memory, the ruling and the angle in the stored detection result, or by using, for another plate, for which no detection result has been stored in the memory, a ruling and an angle obtained as a result of detection performed by the detector.

2. The image processing apparatus according to claim 1, wherein
   the converter is configured to determine whether or not there is an inconsistency between the ruling and the angle detected by the detector and a ruling and an angle of a second plate, and
   the memory is configured to store the detection result obtained by the detector in a case where the converter has determined that there is no inconsistency.

3. The image processing apparatus according to claim 1, wherein
   the converter is configured to determine whether or not there is an inconsistency in rulings and angles stored in the memory, and cause the detector to detect a ruling and an angle of a plate for which an inconsistency has been determined.

4. The image processing apparatus according to claim 1, wherein
   the converter is configured to cause the detector to detect a ruling and an angle of a plate that meets a predetermined condition and, in a case where the ruling the angle of the plate that meets the predetermined condition have been stored in the memory, determine whether or not to cause the detector to detect a ruling and an angle of a plate other than the plate that meets the predetermined condition, using a result of comparison of the detected ruling and angle and the stored ruling and angle.

5. The image processing apparatus according to claim 2, wherein
   the converter is configured to cause the detector to detect a ruling and an angle of a plate that meets a predetermined condition and, in a case where the ruling the angle of the plate that meets the predetermined condition have been stored in the memory, determine whether or not to cause the detector to detect a ruling and an angle of a plate other than the plate that meets the predetermined condition, using a result of comparison of the detected ruling and angle and the stored ruling and angle.

6. The image processing apparatus according to claim 3, wherein
   the converter is configured to cause the detector to detect a ruling and an angle of a plate that meets a predetermined condition and, in a case where the ruling and the angle of the plate that meets the predetermined condition have been stored in the memory, determine whether or not to cause the detector to detect a ruling and an angle of a plate other than the plate that meets the predetermined condition, using a result of comparison of the detected ruling and angle and the stored ruling and angle.

7. The image processing apparatus according to claim 1, wherein
   the memory is configured to store a plurality of combinations of a ruling and an angle of the plate, and
   the converter is configured to cause the detector to detect a ruling and an angle of a plate that meets a predetermined condition, and select and use a combination of a ruling and angle of the plate from among the plurality of combinations stored in the memory, the combination corresponding to a result of detection performed by the detector.

8. The image processing apparatus according to claim 2, wherein the memory is configured to store a plurality of combinations of a ruling and an angle of the plate, and the converter is configured to cause the detector to detect a ruling and an angle of a plate that meets a predetermined condition, and select and use a combination of a ruling and angle of the plate from among the plurality of combinations stored in the memory, the combination corresponding to a result of detection performed by the detector.

9. The image processing apparatus according to claim 3, wherein the memory is configured to store a plurality of combinations of a ruling and an angle of the plate, and the converter is configured to cause the detector to detect a ruling and an angle of a plate that meets a predetermined condition, and select and use a combination of a ruling and angle of the plate from among the plurality of combinations stored in the memory, the combination corresponding to a result of detection performed by the detector.

10. The image processing apparatus according to claim 7, wherein the converter is configured to, in a case where a detection result corresponding to the ruling and the angle obtained by the detector for the plate that meets the predetermined condition has not been stored in the memory, cause the detector to detect a ruling and an angle of a plate other than the plate that meets the predetermined condition, and perform conversion into the multi-level image, and the memory is configured to newly store a combination of a ruling and an angle of the plate.

11. The image processing apparatus according to claim 8, wherein the converter is configured to, in a case where a detection result corresponding to the ruling and the angle obtained by the detector for the plate that meets the predetermined condition has not been stored in the memory, cause the detector to detect a ruling and an angle of a plate other than the plate that meets the predetermined condition, and perform conversion into the multi-level image, and the memory is configured to newly store a combination of a ruling and an angle of the plate.

12. The image processing apparatus according to claim 9, wherein the converter is configured to, in a case where a detection result corresponding to the ruling and the angle obtained by the detector for the plate that meets the predetermined condition has not been stored in the memory, cause the detector to detect a ruling and an angle of a plate other than the plate that meets the predetermined condition, and perform conversion into the multi-level image, and the memory is configured to newly store a combination of a ruling and an angle of the plate.

13. The image processing apparatus according to claim 1, wherein the converter is configured to convert the image obtained as the result of screen processing into the multi-level image by:

in response to the detection result for the plate being stored in the memory, using for the plate the ruling and the angle in the stored detection result; and in response to no detection result being stored in the memory for the another plate, using for the another plate the ruling and the angle obtained as the result of detection performed by the detector.

14. An image processing method comprising:

detecting a ruling and an angle of a screen from a binary image of a plate, the binary image being obtained as a result of screen processing;

storing, in a memory, a detection result for the plate for which the ruling and the angle have been detected; and converting an image obtained as a result of screen processing into a multi-level image by using, for the plate for which the detection result has been stored, the ruling and the angle in the stored detection result, or by using, for another plate, for which no detection result has been stored in the memory, a ruling and an angle obtained as a result of detection.

15. A non-transitory computer readable medium storing a program causing a computer to execute a process for image processing, the process comprising:

detecting a ruling and an angle of a screen from a binary image of a plate, the binary image being obtained as a result of screen processing;

storing a detection result for the plate for which the ruling and the angle have been detected; and converting an image obtained as a result of screen processing into a multi-level image by using, for the plate for which the detection result has been stored, the ruling and the angle in the stored detection result, or by using, for another plate, for which no detection result has been stored, a ruling and an angle obtained as a result of detection.

* * * * *